April 1, 1941.  M. H. JOHANSON  2,236,909

METHOD AND APPARATUS FOR CUTTING GEARS

Filed June 19, 1939  2 Sheets-Sheet 1

INVENTOR
Magnus H. Johanson
BY
ATTORNEY

April 1, 1941.  M. H. JOHANSON  2,236,909
METHOD AND APPARATUS FOR CUTTING GEARS
Filed June 19, 1939  2 Sheets-Sheet 2

Inventor
Magnus H. Johanson
By
B. E. Schlesinger
Attorney

Patented Apr. 1, 1941

2,236,909

UNITED STATES PATENT OFFICE 2,236,909

METHOD AND APPARATUS FOR CUTTING GEARS

Magnus H. Johanson, Rochester, N. Y., assignor to Gleason Works, Rochester, N. Y., a corporation of New York Application June 19, 1939, Serial No. 279,779

6 Claims. (Cl. 90—4)

The present invention relates to a method and to apparatus for producing longitudinally curved tooth gears such as spiral bevel and hypoid gears. In particular, the invention relates to a method and to apparatus for finish-cutting spiral bevel and hypoid gears without generating roll by the so-called "single-cycle" process. In the "single-cycle" process, a face-mill gear cutter is employed that has its cutting blades arranged part-way only around its periphery with a gap between its last and first blades, the cutter is rotated continuously in engagement with the gear blank, and the blank is indexed when the gap in the cutter is abreast of the blank.

Among the objects of the invention are to provide an improved method of cutting gears according to the "single-cycle" process and a new and improved type of cutter for use in practicing the method which is simpler to manufacture and therefore cheaper than known types of such cutters.

A further object of the invention is to provide a simple means which may be incorporated in known types of gear cutting machines to permit of practicing the method of the present invention.

Other objects of the invention will be apparent hereinafter from the specification and from the recital of the appended claims.

Figure 1:
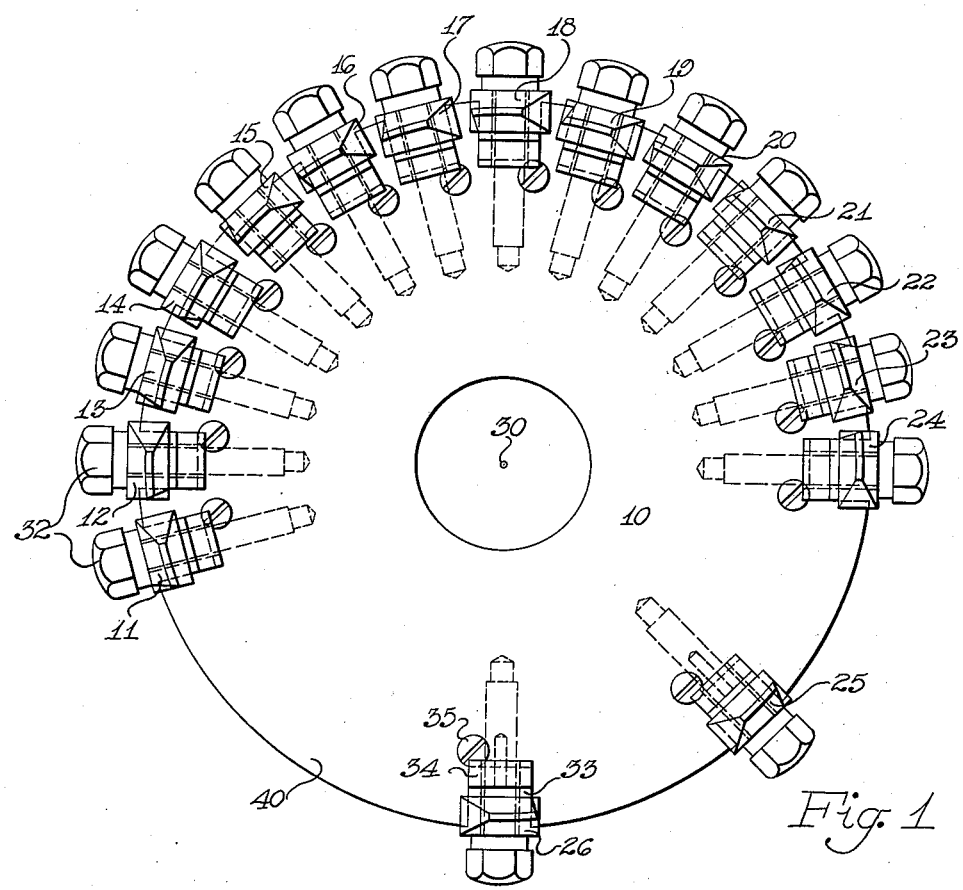
Fig. 1 is a plan view of a cutter constructed according to a preferred embodiment of the present invention.

With the present invention, a cutter is employed that is like a standard face-mill gear cutter in that all of its blades are of substantially equal height, are arranged at substantially the same radial distance from the axis of the cutter, have a uniform point width, and in that all the cutting edges for cutting one side of a tooth of the blank have the same positive pressure angle or inclination to the axis of the cutter. It differs from a standard face-mill gear cutter in that, as in all "single-cycle" type cutters, a gap is provided between the last and first blades to permit of indexing the gear blank without complete withdrawal of the cutter from engagement with the blank. The blades for taking the final cuts on opposite sides of the tooth spaces of the blank may also be spaced from the preceding blades a distance greater than the face-width of the blank so that only one blade will be cutting when the final finishing cut is taken on a side of a tooth space and they may also be of slightly less height than the preceding blades so that they will not rub on the bottoms of the tooth spaces. The present cutter has the advantage, then, that it can be relief-ground without special apparatus on a standard face-mill gear cutter relieving grinder. Therefore, it is simpler and cheaper to make than previous forms of "single-cycle" cutters.

The cutter is intended to be used for the finish-cutting of previously roughed out gear blanks. In use, the cutter is adjusted into engagement with the blank to be cut, so that it will commence to cut preferably at a substantial depth in the tooth spaces of the blank but always at less than full depth. The blank is preferably held stationary during cutting. As the cutter is rotated in engagement with the blank, the cutter is fed into the blank until full depth position is reached. As the cutter feeds into depth, each blade removes stock from a side of the tooth space, the amount of stock removed depending on the rate of feed. Since this is a finishing operation, the feed will be slight between operation of successive blades, and each blade will therefore remove only a relatively thin chip from a side of the tooth space so that the desired smooth surface finish may be obtained.

There may be a dwell of the cutter at full depth position so that the final blade or blades may properly clean up the opposite sides of the tooth space. Then, when the gap in the cutter rotates abreast of the blank, the cutter is withdrawn to initial position and the blank is indexed. The cutter does not have to be withdrawn wholly out of engagement with the blank to permit of indexing, for the gap in the cutter will allow of the indexing rotation of the blank without any danger of damage to the blank or the cutter. The operation is therefore, relatively fast. On each revolution of the cutter a tooth space of the blank is finished and when the blank has been indexed through a full revolution, it will be completed.

The invention can be practiced upon gear cutting machines which may be identical with the machines heretofore used for cutting according to the "single-cycle" process except for the provision of means to produce a feed movement of the cutter relative to the blank during the cutter rotation. This feed movement may be produced by a cam driven in time with the rotation of the cutter spindle, and, in fact, the cam may be mounted directly on the cutter spindle to engage a follower fixedly secured in the cutter spindle housing. If the latter construction is used, both cam and cutter are rotated together as the cutter spindle is rotated, with the result that as the cutter is rotated on its axis, it will also be moved axially. The cam will be so formed that as the successive blades of the cutter rotate into engagement with the blank, the cutter will be fed forwardly to cut deeper into the blank and, when the gap in the cutter is abreast of the blank, the cutter spindle will be moved rearwardly to initial position. The known means common to present type "single-cycle" machines may be employed for indexing the blank during the rearward movement of the cutter while the gap is abreast of the blank.

The cam may be a step cam to produce a step-by-step feed movement of the cutter or it may be formed to produce a continuous forward feed movement during cutting.

Reference may be had now to the drawings for a more detailed description of the invention.

10 denotes the body or head of a cutter constructed according to one embodiment of this invention. The cutter head is provided with a plurality of slots in which are mounted the cutting blades 11 to 26 inclusive. The blades are mounted to project beyond one side face of the cutter in the general direction of the axis 30 of the cutter. They may be secured in the slots of the cutter head by bolts 32. Shims 33 and wedges 34 may be provided in each of the slots for the purpose of adjusting the blades radially in the cutter head and the wedges may be adjusted by screws 35 which thread into the cutter head. All this is common construction in face-mill gear cutters.

In the cutter illustrated, alternate blades are sharpened so that they cut, respectively, on opposite sides of a tooth space of a gear blank. Thus the blades 11, 13, 15, etc., are inside cutting blades and the blades 12, 14, 16, etc., are outside cutting blades. The blades might be sharpened, however, so that each would cut on both sides of a tooth space.

The blades 11–24 inclusive, are preferably all made of the same height. The final blades 25 and 26 may be made of the same height as the blades 11–24 inclusive, but preferably will be made of slightly less height than these blades so as to insure that they will not rub on the bottoms of the tooth spaces of a blank.

The blades may be made of straight or curved profile. All of the inside blades 11, 13, etc., are made to the same positive pressure angle and are adjusted to the same radial distance from the axis 30 of the cutter. All the outside blades 12, 14, etc., are made of the same positive pressure angle and adjusted at the same radial distance from the axis of the cutter. The point width of the cutter is, therefore, constant around its whole periphery.

As is shown, the blades are arranged part-way only around the periphery of the cutter and there is a gap 40 between the last blade 26 and the first blade 11 which is of sufficient angular extent to permit of indexing a gear blank, when the gap is abreast of the blank, without complete separation of the cutter from the blank. Preferably the last inside cutting blade 25 is spaced angularly from the next preceding outside cutting blade 24 a distance slightly greater than the width of face of the gear to be cut so that when the blade 25 is taking its cut, no other blade will be in engagement with the blank. Likewise, the last outside cutting blade 26 is preferably spaced angularly from the next preceding inside cutting blade 25 a distance greater than the face-width of the gear to be cut. By so spacing the final two blades, assurance will be had that only one blade will be cutting in a tooth space of the gear blank when the final finishing cuts are taken on the opposite sides of the tooth space. This insures a fine finish on the opposite sides of each tooth space and more accurate spacing of the tooth spaces from one another.

The blades 11–24 inclusive may be mounted relatively close to one another for economy of space and to insure having as many cutting blades as possible in the cutter. Two or more of these blades may, without detriment, operate in a tooth space at the same time; the final tooth surface finish is produced by the final blades 25 and 26.

The cutter is intended to operate upon a gear blank whose tooth spaces have previously been roughed out. It may be adjusted initially so that it is fully out of engagement with the tooth spaces of the blank, but for efficiency in cutting, it is preferably adjusted so that when the first cutting blade 11 cuts, it will cut at some depth in the tooth space of the blank. As successive blades of the cutter take their cuts, the cutter will be fed further into depth until full depth position is reached.

Figure 2:
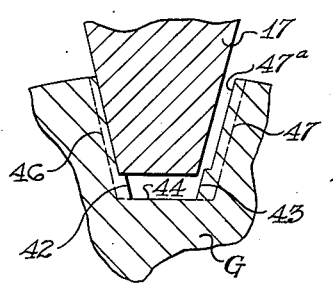
Figs. 2, 3 and 4 are diagrammatic views illustrating successive steps in the cutting of a tooth space of a gear according to the present invention.
Figure 3:
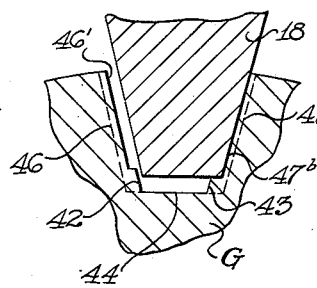
Figure 4:
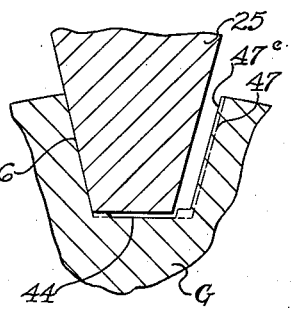

Figs. 2 to 4 inclusive illustrate the cutting operation. Fig. 2 shows the position of the cutter and blank after the feed has proceeded for some time and when the blade 17 is cutting. 42, 43 and 44 denote, respectively, the opposite sides and the bottom of a roughed tooth space of the gear blank. The dotted lines 46 and 47 designate the sides of the tooth space when the finish-cutting operation is completed.

Before the cutter has been rotated and fed far enough to bring the cutting blade 17 into cutting position, the roughed sides 42 and 43 of the tooth space will already have been recut to some extent by the blades 11 to 16 inclusive. Only the lower portions of the roughed sides 42 and 43 of the tooth slots will not have been recut. The outside cutting blades 12, 14 and 16 will already by their successive cutting action, for instance, have recut the upper portion of the roughed tooth side 43 back to the point designated by the line 47a. The inside cutting blades 11, 13 and 15 will, by their successive action have cut back correspondingly the upper portion of the roughed tooth surface 42.

As the blade 17 is moved across the gear blank by the rotation of the cutter, it will take a cut on the side of the tooth space which will be somewhat deeper than the cuts taken by the preceding blades of the cutter because of the axial feed movement of the cutter between operation of the blade 16 and operation of the blade 17. The blade 17, then, will take a thin chip from the inside of the tooth slot to the extent of its depth of cut. When the blade 17 has finished its cut, the concave side of the tooth space will have been recut to the extent denoted by the line 46'.

Between the operation of the blade 17 and the next succeeding blade 18, the cutter will have been fed axially to some extent. Thus, the blade 18 will cut on the convex side of the tooth space to a depth somewhat greater than the blade 17 and will remove stock from the roughed side 43 of the tooth space to the point denoted by the line 47b in Fig. 3.

Successive blades 19 to 24 will take their cuts, each deeper than the other and each removing a chip from one side of the roughed tooth space due to their positive pressure angle and the axial feed of the cutter. When the blade 25 comes into action, it will take the final cut on the concave side of the tooth space, leaving the finished side surface 46, as shown in Fig. 4. When the final outside cutting blade 26 takes its cut, it will finish the convex tooth side 47, removing the stock which has been left between the lines 47c and 47 by the preceding blades.

As has already been stated, the finishing blades 25 and 26 will preferably be made slightly shorter than the blades 11 to 24 inclusive so that they will not rub on the bottoms of the tooth slots. Rubbing might cause chatter and affect the final tooth surface finish. Since the blades 25 and 26 do not cut to full depth, the sides of the tooth slots of the gear will not be finish-cut to full roughing depth. However, the amount of unfinished surface left will be very slight and since this is below the working depth of the gear teeth, it will not affect their operation.

Figure 5:
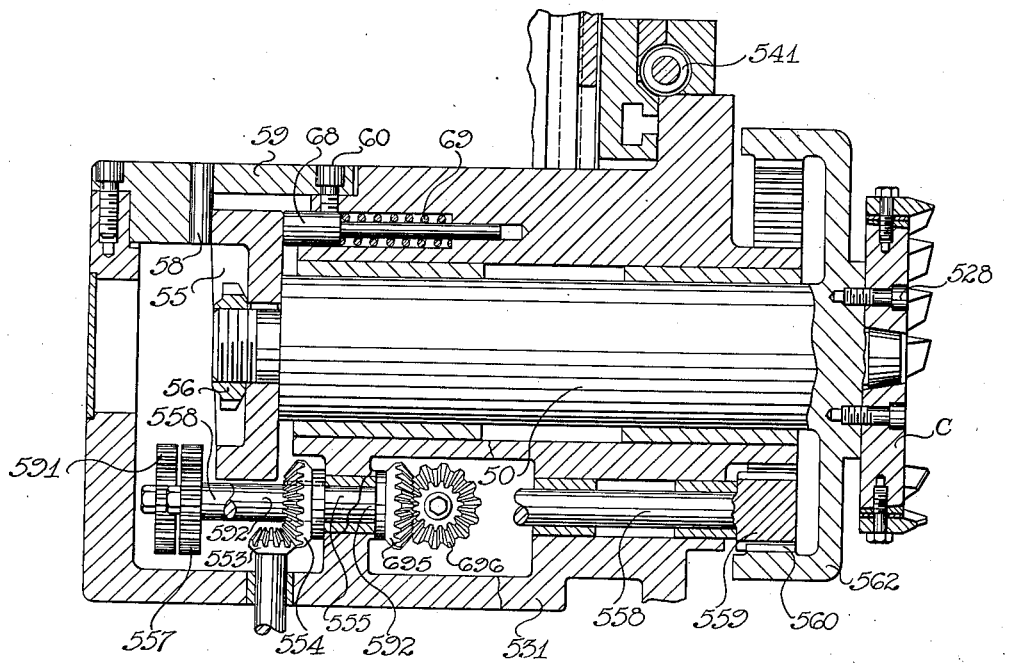
Fig. 5 is a vertical sectional view through the cutter spindle and housing of a gear cutting machine constructed to operate according to the present invention.

With a very slight alteration, a gear finishing machine such as illustrated and described in the U. S. patent of Schauseil and Gleason No. 2,044,485 of June 16, 1936, may be modified to practice the present invention. The changes that might be required are illustrated in Fig. 5 of the present drawings and involve merely modifications in the cutter end of the machine. The work end of the machine and the gearing may be the same as in the patent referred to. Parts illustrated in Fig. 5, which are identical with those illustrated in the patent, are denoted by reference numerals, which are the same as the reference numerals employed in the patent to designate them, except that they are increased by 500.

A cutter C constructed according to the present invention is secured to the cutter spindle 50 of the machine by screws 528. The cutter spindle is suitably journaled in the cutter support or carrier 531. The cutter spindle is driven, as in the machine of the patent, from a main drive motor through bevel gearing 553 and 554, spur change gears including the change gear 557, the shaft 558, the spur pinion 559 and the internal gear 560. The last named is secured to the hood or guard 562 which is secured to the cutter spindle 50.

The indexing mechanism of the machine may be identical with that of the patent and is operated in time with the cutter rotation, being driven from the shaft 555 through change gears including the change gear 591, the shaft 592, and the bevel gearing 695 and 696. Thus the index mechanism will be actuated when the gap in the cutter is abreast of the blank to index the blank once for each revolution of the cutter. To the rear end of the cutter spindle 50 is secured a cam 55. This may be keyed to the spindle and held against axial movement by a nut 56 which threads on the spindle. The cam 55 is a face cam and is adapted to engage a hardened follower 58 which is secured to or made integral with a plate 59. The plate 59 is fastened by means of screws 60 in an opening in the cutter support or carrier 531.

Figure 6:
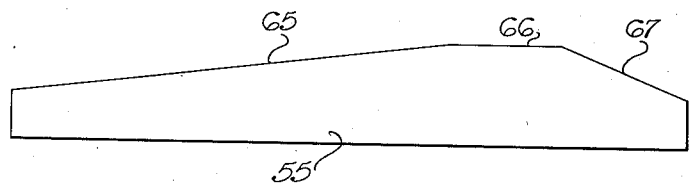
Fig. 6 is a diagrammatic developed view of a cam such as may be employed on this machine for controlling the relative depthwise movement of the cutter during cutting.

A layout or development of a typical cam 55 is shown in Fig. 6. It has a rise portion 65 for feeding the cutter axially to full depth position, a dwell portion 66 for holding the cutter at full depth while the final blades 25 and 26 are cutting, and a return portion 67 for rearward axial movement of the cutter to return it to initial position. It is during the rearward movement that the indexing mechanism of the machine will operate to index the gear blank.

The cam 55 is held against the follower 58 by a spring-pressed plunger 68 which is mounted reciprocably in a suitable opening in the cutter support or carrier 531 and which is actuated by a coil spring 69. The head of the plunger presses against the back-face of the cam.

While the invention has been described in connection with a particular embodiment thereof, it will be understood that it is capable of further modification and this application is intended to cover any variations, uses, or adaptations of the invention following, in general, the principles of the invention and including such departures from the disclosure as come within known or customary practice in the art and as may be applied to the essential features hereinbefore set forth and as fall within the scope of the invention or the limits of the appended claims.

Having thus described my invention, what I claim is:

1. The method of cutting a longitudinally curved tooth gear which comprises employing a face-mill gear cutter which has a plurality of cutting blades arranged part-way only around its periphery with a gap between the last and first blades, rotating the cutter in engagement with a gear blank while producing a relative depthwise feed movement of the cutter into the blank, and withdrawing the cutter to initial position and indexing the blank when the gap in the cutter is abreast of the blank.

2. The method of cutting a longitudinally curved tooth gear which comprises employing a face-mill gear cutter which has a plurality of cutting blades arranged part-way only around its periphery whose opposite side-cutting edges have respectively the same inclination to the axis of the cutter and are arranged at substantially the same radial distance from the axis of the cutter and which has a gap between the last and first blades, rotating the cutter in engagement with the gear blank while producing a relative axial feed movement of the cutter into the blank, and withdrawing the cutter axially and indexing the blank when the gap in the cutter is abreast of the blank.

3. In a gear cutting machine of the intermittent indexing type, a tool support, a face-mill gear cutter journaled on said support having a plurality of cutting blades arranged part-way only around its periphery with a gap between the last and first blades, means for rotating the cutter on its axis, means for producing a relative depthwise feed movement between the cutter and the work in one direction while the blades are cutting and in the opposite direction when the gap is abreast of the work, and means for indexing the work when the gap is abreast of the work.

4. In a machine of the intermittent indexing type, a tool support, a spindle journaled in said support, a face-mill gear cutter secured to said spindle and having a plurality of cutting blades arranged part-way only around its periphery with a gap between the last and first blades, a cam and a follower, one of which is secured to the spindle and the other to said support, means for rotating the spindle to effect simultaneously rotation of the cutter and axial movement thereof under control of the cam and follower, and means for indexing the work when the gap in the cutter is abreast of the work.

5. In a gear cutting machine of the intermittent indexing type, a tool support, a spindle mounted in said support for both rotational and axial movement, a face-mill gear cutter secured to said spindle having a plurality of cutting blades which are arranged part-way only around its periphery and which have opposite side-cutting edges that have, respectively, the same inclination to the axis of the cutter, means for rotating the spindle, and means for simultaneously producing axial movement of the spindle alternately forward and back in time with the cutter rotation, and means for indexing the work when the gap in the cutter is abreast of the work.

6. In a gear cutting machine of the intermittent indexing type, a tool support, a tool spindle journaled in said support, a face-mill gear cutter which is secured to said spindle and which has a plurality of cutting blades that are arranged at the same radial distance from the axis of the cutter but part way only around the periphery of the cutter so that there is a gap between the first and last blades, the corresponding side cutting edges of said blades having the same inclination to the axis of the cutter, means for rotating the tool spindle, means for producing a relative feed movement between the cutter and the work axially of the tool spindle in time with the rotation of said spindle while the blades of the cutter are cutting and for producing an equal withdrawal movement axially of the tool spindle when the gap in the cutter is abreast of the work, and means for indexing the work when the gap in the cutter is abreast of the work.

MAGNUS H. JOHANSON.